United States Patent
Shiba

(10) Patent No.: US 9,042,409 B2
(45) Date of Patent: May 26, 2015

(54) PACKET PROCESSOR AND METHOD FOR PROCESSING PACKETS BY MEANS OF INTERNAL CONTROL PACKETS

(71) Applicant: Oki Electric Industry Co., Ltd., Tokyo (JP)

(72) Inventor: Shugo Shiba, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 199 days.

(21) Appl. No.: 13/658,510

(22) Filed: Oct. 23, 2012

(65) Prior Publication Data

US 2013/0128900 A1 May 23, 2013

(30) Foreign Application Priority Data

Nov. 18, 2011 (JP) ................................ 2011-252684

(51) Int. Cl.
*H04J 3/24* (2006.01)
*H04L 12/861* (2013.01)
*H04L 12/26* (2006.01)
*H04L 29/06* (2006.01)
*H04L 12/935* (2013.01)
*H04L 12/933* (2013.01)

(52) U.S. Cl.
CPC ............ *H04L 49/90* (2013.01); *H04L 49/3018* (2013.01); *H04L 43/10* (2013.01); *H04L 49/30* (2013.01); *H04L 49/15* (2013.01); *H04L 49/9042* (2013.01); *H04L 29/0653* (2013.01)

(58) Field of Classification Search
None
See application file for complete search history.

(56) References Cited

U.S. PATENT DOCUMENTS

| | | | |
|---|---|---|---|
| 5,610,918 A * | 3/1997 | Kamo et al. | 370/395.5 |
| 5,946,313 A * | 8/1999 | Allan et al. | 370/397 |
| 6,006,287 A * | 12/1999 | Wakazu | 710/22 |
| 6,526,051 B1 * | 2/2003 | Kandler | 370/389 |
| 6,920,113 B1 * | 7/2005 | Kovvali et al. | 370/255 |
| 7,240,350 B1 * | 7/2007 | Eberhard et al. | 719/314 |
| 7,308,003 B2 * | 12/2007 | Lev et al. | 370/474 |
| 7,581,038 B1 * | 8/2009 | Lieberman et al. | 710/9 |
| 7,596,740 B1 * | 9/2009 | Cuppett et al. | 714/776 |
| 8,310,927 B1 * | 11/2012 | Cohen | 370/231 |
| 8,432,882 B2 * | 4/2013 | Crookes et al. | 370/342 |
| 2002/0136207 A1 * | 9/2002 | Matsumoto et al. | 370/352 |
| 2003/0182429 A1 * | 9/2003 | Jagels | 709/227 |
| 2004/0019642 A1 * | 1/2004 | Jinzaki | 709/205 |
| 2004/0085999 A1 * | 5/2004 | Burnett et al. | 370/474 |
| 2004/0111640 A1 * | 6/2004 | Baum | 713/201 |
| 2006/0018664 A1 * | 1/2006 | Levinson et al. | 398/135 |

(Continued)

FOREIGN PATENT DOCUMENTS

JP 2010-028708 A 2/2010

*Primary Examiner* — Bunjob Jaroenchonwanit
(74) *Attorney, Agent, or Firm* — Rabin & Berdo, P.C.

(57) ABSTRACT

A packet processor for processing an input packet includes an information generator for generating process control information for processing the input packet, an internal packet generator for receiving the input packet as an packet to be processed and adding the process control information to the packet to be processed to produce an internal packet, an internal packet processor for processing the internal packet supplied from the internal packet generator on the basis of the process control information added to the internal packet, and a packet transmitter for extracting an output packet from the internal packet processed by the internal packet processor to transmit the output packet. The packet processor can reduce the amount of communication between modules even when the packet processor includes plural modules.

8 Claims, 11 Drawing Sheets

(56) References Cited

U.S. PATENT DOCUMENTS

| | | |
|---|---|---|
| 2006/0092985 A1* | 5/2006 | Cho et al. .................... 370/528 |
| 2006/0140119 A1* | 6/2006 | Yeh et al. .................... 370/235 |
| 2006/0285545 A1* | 12/2006 | Schmidt et al. ............. 370/401 |
| 2007/0165676 A1* | 7/2007 | Kato ............................ 370/487 |
| 2007/0210916 A1* | 9/2007 | Ogushi et al. ............... 340/531 |
| 2009/0028189 A1* | 1/2009 | Kato et al. .................. 370/476 |
| 2009/0187971 A1* | 7/2009 | Bao et al. ........................ 726/3 |
| 2010/0070264 A1* | 3/2010 | Lee ................................ 704/8 |
| 2010/0153363 A1* | 6/2010 | Suzuki et al. ................ 707/720 |
| 2010/0162337 A1* | 6/2010 | Lee et al. .................... 725/111 |
| 2010/0182997 A1* | 7/2010 | Yang et al. .................... 370/352 |
| 2010/0226443 A1* | 9/2010 | Citta et al. ................ 375/240.26 |
| 2010/0238852 A1* | 9/2010 | Fujita et al. .................... 370/312 |
| 2011/0194517 A1* | 8/2011 | Nagata et al. ................ 370/329 |
| 2011/0211827 A1* | 9/2011 | Soto et al. ........................ 398/25 |
| 2011/0231566 A1* | 9/2011 | Gelter et al. ................ 709/231 |
| 2011/0317578 A1* | 12/2011 | Tomita et al. ................ 370/252 |
| 2012/0096484 A1* | 4/2012 | Tanaka et al. .................... 725/31 |
| 2012/0192278 A1* | 7/2012 | Kito et al. ........................ 726/24 |
| 2012/0281715 A1* | 11/2012 | Shojania et al. ............. 370/468 |
| 2012/0290646 A1* | 11/2012 | Sundarrajan et al. ......... 709/203 |
| 2013/0128900 A1* | 5/2013 | Shiba ............................ 370/474 |

* cited by examiner

| DATA STREAM ID | DATA STREAM IDENTIFICATION ||||
| | SOURCE ADDRESS | SOURCE PORT NUMBER | DESTINATION ADDRESS | DESTINATION PORT NUMBER |
| --- | --- | --- | --- | --- |
| FID1 | IP1 | P1 | IP2 | P2 |
| FID2 | IP2 | P2 | IP1 | P1 |
| ⋮ | ⋮ | ⋮ | ⋮ | ⋮ |

86

FIG. 8
| DATA STREAM ID | MEDIA CONVERSION ID | ASSIGNED CORE MAC ADDRESS |
|---|---|---|
| FID1 | TID1 | MAC311 |
| FID2 | TID2 | MAC321 |
| ⋮ | ⋮ | ⋮ |
88
FIG. 9A
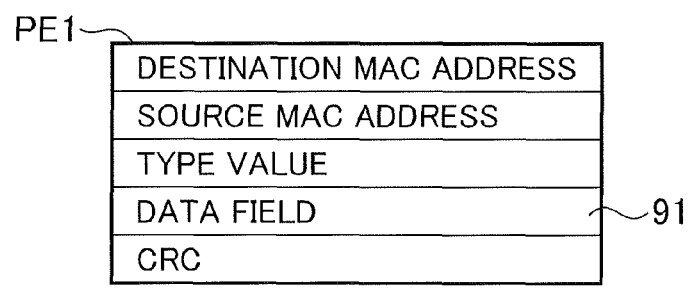
FIG. 9B
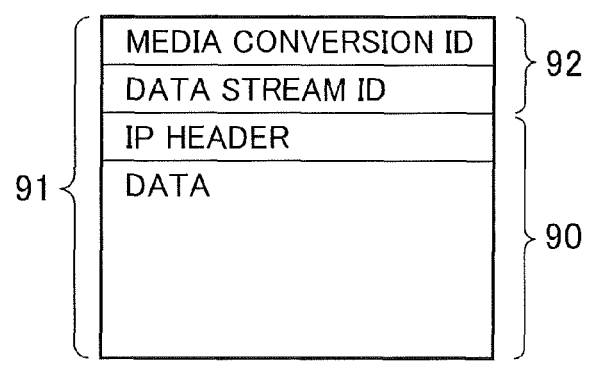

| BUFFER ID | DATA STREAM ID |
|---|---|
| BID1 | FID1 |
| BID2 | — |
| ⋮ | ⋮ |
| BIDM | — |

104

PACKET PROCESSOR AND METHOD FOR PROCESSING PACKETS BY MEANS OF INTERNAL CONTROL PACKETS

BACKGROUND OF THE INVENTION

1. Field of the Invention

The present invention relates to a packet processor and a packet processing method which can be applied, for example, to a media converter server for processing packets such as of audio data in real time.

2. Description of the Background Art

As hardware standards that can be applied to communication devices, more specifically packet processors, such as SIP (Session Initiation Protocol) servers designed for network common carriers, ATCA (Advanced Telecom Computing Architecture) standards have been heretofore available.

The ATCA stipulates hardware specifications on a shelf and blades inserted into the shelf, which constitute a communication device. Communication devices developed in accordance with standards such as the ATCA can be enhanced in developing efficiency and reduced in development costs. Furthermore, it can be assured that developed devices are high in scalability.

Japanese patent laid-open publication No. 2010-28708 to Ito et al., teaches a conventional packet processor complying with the ATCA standards. Devices built under standards such as the ATCA like the processor set forth in Ito et al., may be inferior in inter-module data transfer rate to intra-module. Moreover, transferring data between modules in the form of frame format such as Ethernet (trademark) frame requires processing for assembling data into frames.

Therefore, it is advisable that a packet processor including a plurality of modules according to the ATCA standards or the like reduces the amount of communication between the modules to the minimum.

However, when a module is built according to the ATCA standards or the like, the shape and size of the module may be restricted so that it is difficult to implement the required functions and sufficient processing capacity into a single module. Especially, modules for use in a large-scale system oriented for telecommunications common carriers may have a large number of semiconductor devices installed therein so that there may be a tendency that the number of modules making up such a packet processor is increased.

Furthermore, a single module having various functions installed may involve a problem that it is more inflexible in coping with modifications of specifications such as replacement of some modules or addition of another module than separate modules having respective functions installed.

SUMMARY OF THE INVENTION

It is therefore an object of the present invention to provide a packet processor and a method therefor capable of reducing the amount of communication between modules even with the processor built into a plurality of modules.

In accordance with the present invention, a packet processor for processing an input packet includes an information generator for generating process control information for processing the input packet, an internal packet generator for receiving the input packet as an packet to be processed and adding the process control information to the packet to be processed to produce an internal packet, an internal packet processor for processing the internal packet on the basis of the process control information added to the internal packet, and a packet transmitter for extracting an output packet from the internal packet processed by the internal packet processor to transmit the output packet.

Also in accordance with the present invention, a method for processing an input packet inputted into a packet processor includes the steps of receiving the input packet as an packet to be processed, generating process control information for processing the input packet, adding the process control information to the packet to be processed to produce an internal packet, processing the internal packet on the basis of the process control information added to the internal packet, extracting an output packet from the processed internal packet, and transmitting the output packet outside the processor.

According to a packet processor of the present invention, the amount of communication between modules in the packet processor can reduce even when the packet processor includes a plurality of modules.

BRIEF DESCRIPTION OF THE DRAWINGS

The objects and features of the present invention will become more apparent from consideration of the following detailed description taken in conjunction with the accompanying drawings in which:

FIG. 8 shows a header processing table held in the packet receiving module shown in FIG. 4;

FIGS. 9A and 9B show an example of configuration of an internal packet flowing between the modules in the packet processor shown in FIG. 1;

DESCRIPTION OF THE PREFERRED EMBODIMENTS

Figure 1:
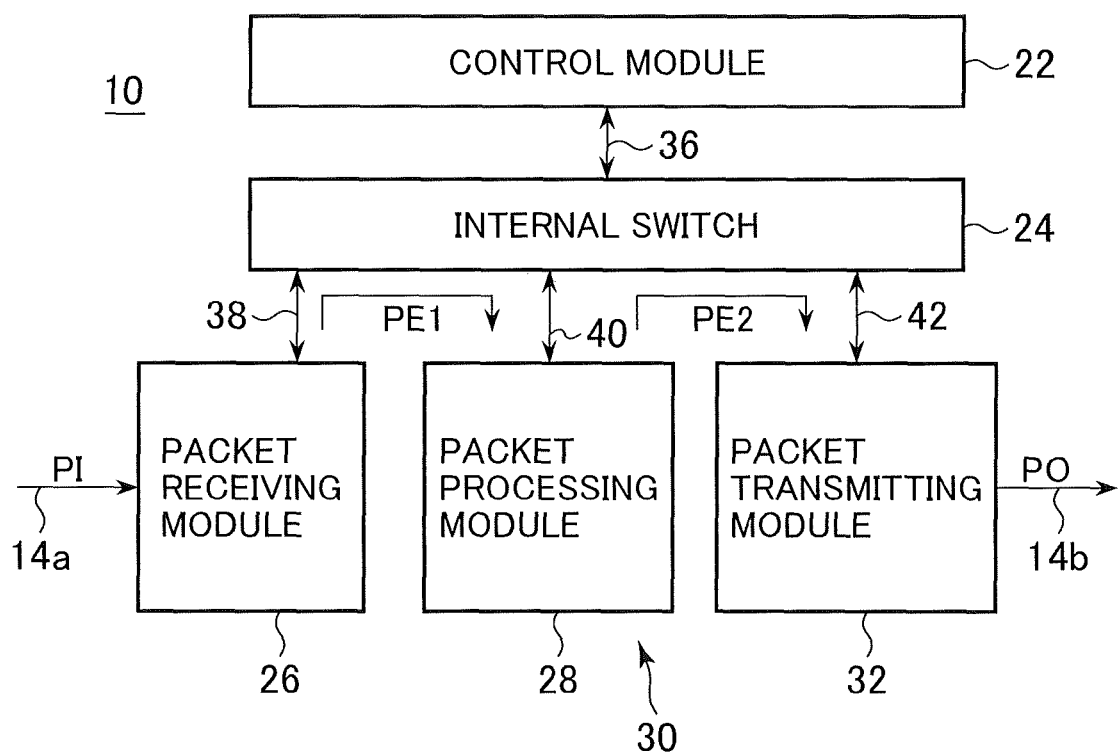
FIG. 1 is a schematic block diagram showing the configuration of a packet processor in accordance with an embodiment of the present invention.
Figure 2:
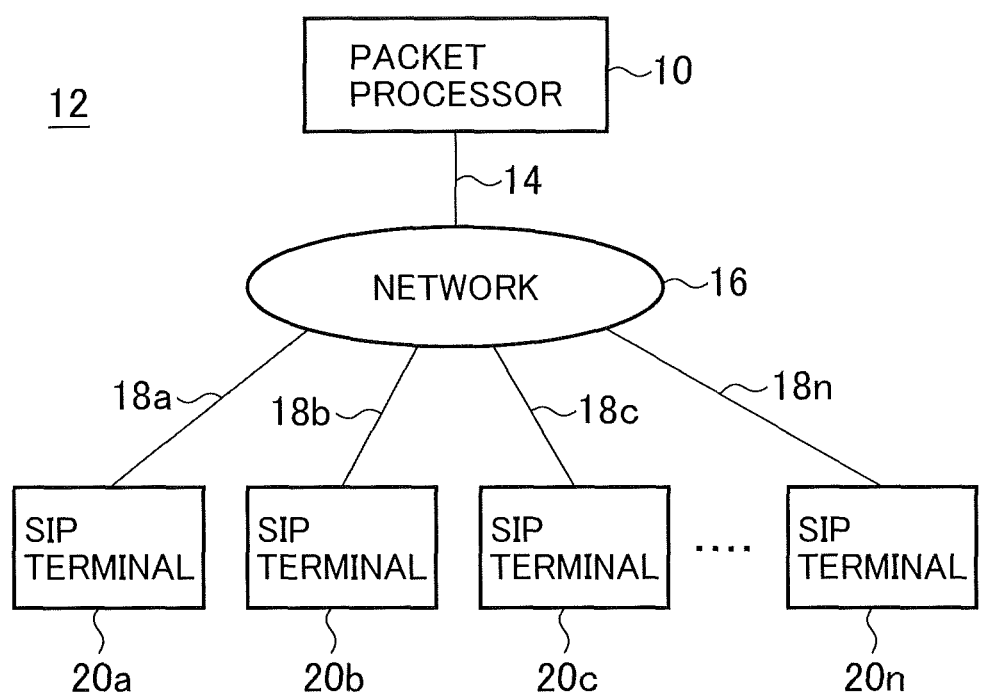
FIG. 2 is a schematic block diagram showing the whole configuration of a telecommunications network system equipped with the packet processor shown in FIG. 1.

A preferred embodiment of packet processor according to the present invention will be described in detail with reference to the drawings. FIG. 1 schematically shows the configuration of a preferred embodiment of packet processor 10 in accordance with the invention. FIG. 2 also schematically shows the whole configuration of a telecommunications network system 12 including the packet processor 10.

With reference first to FIG. 2, in the telecommunications system 12, the packet processor 10 is connected via a communication line 14 to a network 16, which is connected via communication lines 18a to 18n to SIP (Session Initiation Protocol) terminals 20a to 20n, respectively. The processor 10 processes and relays packets transferring between the SIP terminals 20 over the network 16. With the illustrative embodiment, the network 16 may be an IP (Internet Protocol) network. In the telecommunications system 12, the number of the SIP terminals 20 may not be restricted, of course.

In this embodiment, the SIP terminals 20 may be communication terminals compliant with the SIP. More specifically, the SIP terminals 20 may send and receive messages or perform media communications, such as a voice or video call, over the SIP. As the SIP terminals 20, any types of terminals compliant with the SIP may be used, and thus detailed description thereon is refrained from. However, various existing communication schemes or protocols other than the SIP may be employed.

In this illustrative embodiment, the packet processor 10 can serve as a media conversion server for processing packets in which data related to media communications between the SIP terminals 20 are inserted. The packets processed by the processor 10 may be, for example, packets in which speech data accompanying a voice phone conversation are inserted. The packet processor 10 can also serve as a call controller, such as SIP server, for providing call control between the SIP terminals 20.

In this embodiment, the packet processor 10 may be implemented in the form several hardware modules. The hardware modules include a control module 22 for controlling operations of the entire hardware modules to process packets within the packet processor 10, an internal switch 24 for routing data between the modules, a packet receiving module 26 serving as a receiver of packets, a packet processing module 28 serving as an internal packet processor 30 for processing received packets, and a packet transmitting module 32 serving as a transmitter of processed packets.

In this embodiment, the packet processor 10 may be so-called a blade server having one or more platy modules, or blades, mounted into a shelf, which are not shown in the figures. The shelf and hardware modules constituting the packet processor 10 may be structured according to the ATCA (Advanced Telecom Computing Architecture) or other standards.

The packet processor 10 has its input port 14a for receiving packets and its output port 14b for outputting processed packets. The ports 14a and 14b are included in the communication line 14 connecting the packet processor 10 to the network 16.

The hardware modules 22, 24, 26, 28 and 32 are connected to each other via an internal bus. For example, the internal switch 24 is connected via internal buses 36, 38, 40 and 42 to the control module 22, the packet receiving module 26, the packet processing module 28 and the packet transmitting module 32, respectively.

The internal switch 24 acts to route, or switch, a data frame received from one of the modules on the internal buses 36-42 to a destination module. The internal switch 24 can routes Ethernet (trademark) frames.

One or more MAC (Media Access Control) addresses, a kind of Layer 2 address, may be assigned to each module inside the packet processor 10. Each module is so designed to deliver to the internal switch 24 Ethernet frames in which the MAC address indicating a destination module is set in the header thereof.

Such communications between the modules, or inter-module communications, by means of the internal switch 24 may be accomplished by any types of blade server or the like. Thus, the detailed description of the configuration of the internal switch 24 is omitted. Further, communications between the modules within the packet processor 10 may not be restricted to switching Ethernet frames stated above. Rather, various ways of routing internal data can be employed.

As stated above, the control module 22 functions to control the operations of the packet receiving module 26, the packet processing module 28 and the packet transmitting module 32. In the packet processor 10, the modules 26, 28 and 32 operate, under the control of the control module 22, to process input packets (PI) of media communications received from a transmitter SIP terminal 20, and produce output packets (PO) to transmit the output packets PO toward a destination SIP terminal 20.

Next, the internal configuration of the control module 22 will be described with reference to FIG. 3. The control module 22 includes an internal interface 44, which is connected via the internal bus 36 to the internal switch 24, for transmitting and receiving frames to and from the modules 26, 28 and 32 via the internal switch 24. The control module 22 further includes a module controller 46 for controlling the operations of the modules 26, 28 and 32 to process packets, and a call controller 48 for controlling calls between the SIP terminals 20.

The module controller 46 may include several control devices for controlling the operations of the modules 26, 28 and 32 to process packets. For example, the module controller may include an information generator 50 and a cutoff controller 52.

The information generator 50 is adapted to generate process control information for processing input packets PI for preparation for allowing the packet processor 10 to receive new data streams.

The cutoff controller 52 serves to control the packet receiving module 26 for operations on cutting off, or releasing, the voice call between the SIP terminals 20.

The call controller 48 serves as call control. For example, the call controller 48 can transmit and receive, for example, SIP signals such as SIP messages, e.g. INVITE messages, to and from a SIP terminal 20 which is under call control, thus proceed to call control, i.e. signaling.

When the SIP signals are transmitted and received to and from the SIP terminals 20, the call controller 48 may use the packet receiving module 26 and packet transmitting module 32 as interfaces for connection with the network 16. Alternatively, a separate interface for connection with the network 16 may be provided in the packet processor 10. The call control itself performed by the call controller 48 may be similar to processing performed by SIP servers or call control servers known per se. Thus, the detailed description of the call control is omitted herein.

Figure 3:
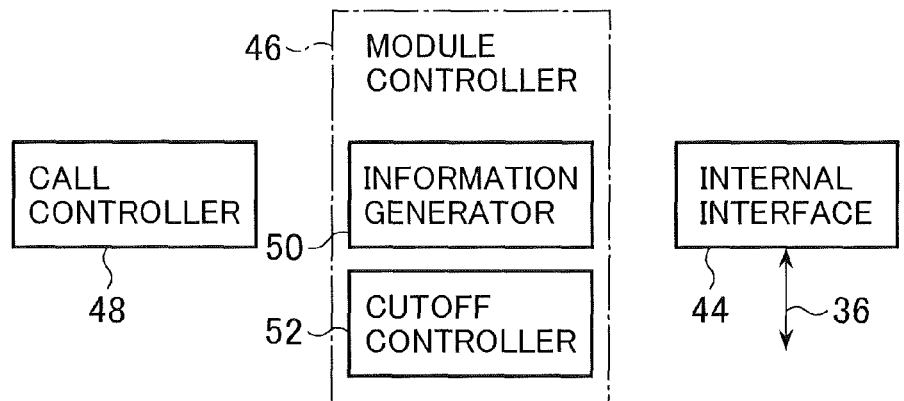
FIG. 3 is a schematic block diagram showing the configuration of a control module included in the packet processor shown in FIG. 1.

In FIG. 3, the call controller 48 is shown to be disposed within the control module 22. However, no restriction may be imposed on where the call controller 48 is disposed. The call controller 48 may be positioned in another module or a separate device outside the control module 22.

When the call control operation between SIP terminals 20 is completed, the call controller 48 gives information on data streams to be processed by the packet processor 10 to the module controller 46.

Figure 4:
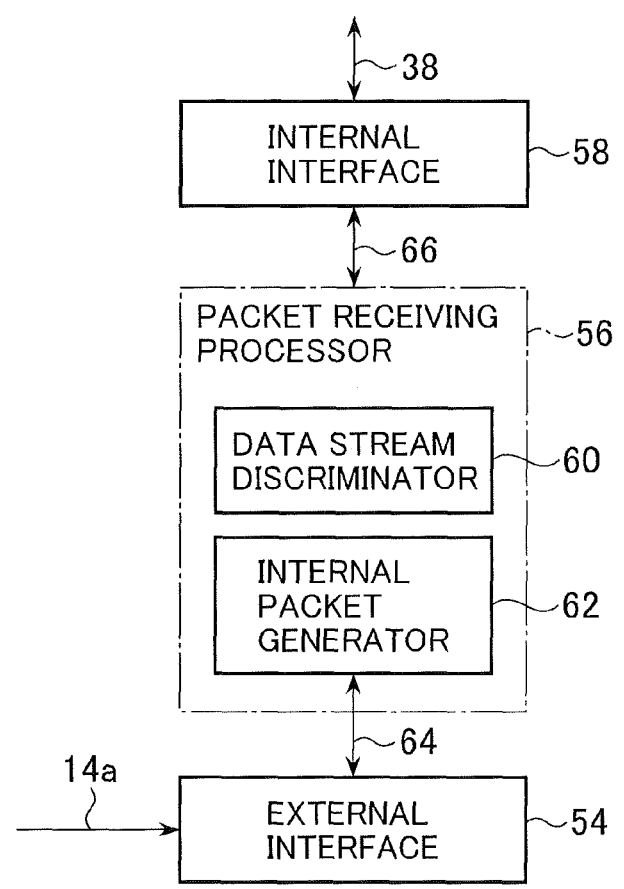
FIG. 4 is a schematic block diagram showing the configuration of a packet receiving module included in the packet processor shown in FIG. 1.

Next, the constitution of the packet receiving module 26 will be briefly described with reference to FIG. 4. The packet receiving module 26 includes an external interface 54 for receiving packets from the network 16, a packet receiving processor 56 for processing the input packets PI, and an internal interface 58 for the conveyance of frames to and from the other modules via the internal switch 24.

The packet receiving processor 56 may include a data stream discriminator 60 for determining a stream of input packets PI, and an internal packet generator 62 for generating internal packets PE1.

The external interface 54 has its input connected via the input port 14a of the packet receiving module 26 to the network 16. The external interface 54 is further connected via an internal bus 64 to the packet receiving processor 56. The external interface 54 delivers the input packets PI supplied from the network 16 to the packet receiving processor 56.

When packets supplied from the external interface 54 are input packets PI of media communications, the packet receiving processor 56 performs the receiving process on the received packets PI by means of the data stream discriminator 60 and the internal packet generator 62. The receiving processor 56 in turn delivers the processed packets as internal packets PE1 to the internal interface 58 on an internal bus 66.

The internal interface 58 is interconnected via the internal bus 38 to the internal switch 24. The internal interface 58 delivers the internal packets PE1, which are supplied from the packet receiving processor 56, to the packet processing module 28.

Figure 5:
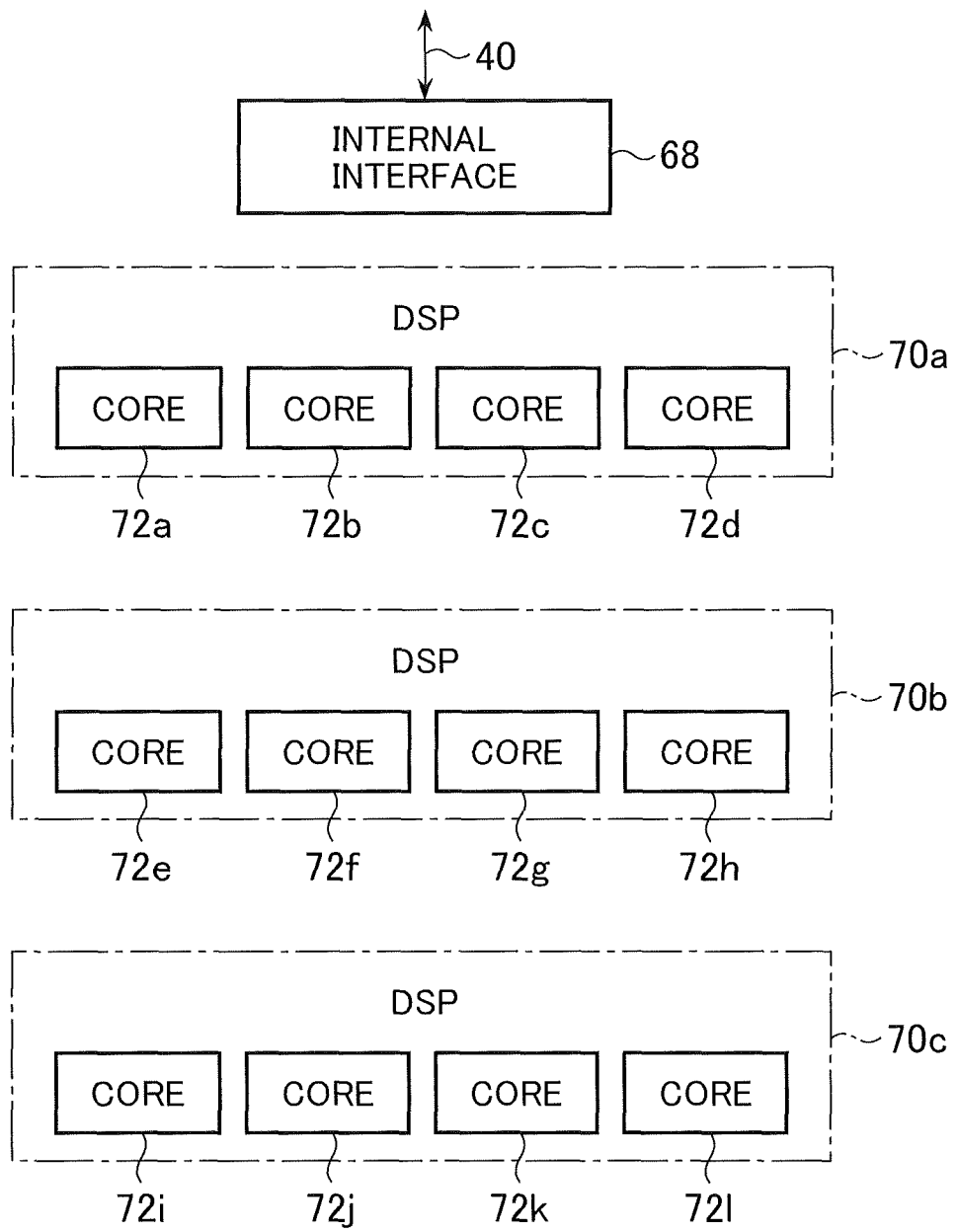
FIG. 5 is a schematic block diagram showing the configuration of a packet processing module included in the packet processor shown in FIG. 1.

Next, the constitution of the packet processing module 28 will be briefly described with reference to FIG. 5. In this embodiment, the single packet processing module 28 constitutes the internal packet processor 30 for processing internal packets PE1.

The packet processing module 28 serving as part of the internal packet processor 30 includes an internal interface 68 and digital signal processors (DSPs) 70. In this preferred embodiment, three DEPs 70a, 70b and 70c are installed in the packet processing module 28. However, no restriction may be imposed on the number of the DSPs 70 installed in the module 28.

The internal interface 68 is interconnected via the internal bus 40 to the internal switch 24 to transfer frames to and from the modules 26 and 32 via the internal switch 24. The internal interface 68 is further adapted to receive the internal packets PE1 supplied from the packet receiving module 26 to transfer them to the destination DSP 70.

The DSP 70 may be implemented on a semiconductor chip, which may be dedicated therefor, such as to process the internal packets PE1 supplied from the packet receiving module 26. In this illustrative embodiment, each DSP 70 can perform a media conversion, e.g. performed by an audio codec, on the data contained in internal packets PE1 supplied from the packet receiving module 26.

Each of the DSPs 70 may be consisted of one or more cores 72. The cores 72 can perform media conversions in parallel to each other. In this embodiment, each DSP 70 includes four cores, which may, for instance in the DSP 70a, be indicated by reference numerals 72a, 72b, 72c and 72d. However, any number of cores may be arbitrarily installed in the DSP 70.

Those cores 72 may be assigned to respective MAC addresses capable of being identified by the internal switch 24 specifically thereto. In the packet processing module 28 in this embodiment, the packet processing module 28 has twelve cores 72 in total over the three DSPs 70a to 70c. Thus, at least twelve different MAC addresses are assigned to the module 28.

For the sake of simplicity, the cores 72a-72d in the DSP 70a have the MAC addresses MAC311-MAC314, respectively. Similarly, the cores 72e-72h in the DSP 70b have the MAC addresses MAC321-MAC324, respectively, and the cores 72i-72l in the DSP 72c have the MAC addresses MAC331-MAC334, respectively.

The internal interface 68 now reads a destination MAC address included in the Ethernet header of internal packets EP1 supplied from the packet receiving module 26 to accordingly supply the internal packets PE1 to the core 72 in the DSP 70.

For illustration, the module controller 46, the packet receiving module 26 and the packet transmitting module 32 have the MAC addresses MAC100, MAC200 and MAC400, respectively.

Upon receiving internal packets PE1, the cores 72 process the internal packets PE1 to produce output packets PO. The cores 72 further assemble internal packets PE2 which have the output packets PO thus produced inserted into the data field thereof and which are destined for the packet transmitting module 32. The cores 70 may thus assemble frames having Ethernet headers. The cores 70 thence supply the packets PE2 to the internal interface 68.

The internal interface 68, when having received the supplied internal packets PE2, sends out the packets PE2 toward the packet transmitting module 32. Adding headers to the output packets PO generated by the cores 72 may be performed by the internal interface 68.

Next, the structure of the packet transmitting module 32 will be schematically described with reference to FIG. 6. The packet transmitting module 32 comprises an internal interface 76 for the conveyance of frames to and from the other modules via the internal switch 24, a packet transmitter 78 for transmitting packets, and an external interface 80 for transmitting packets to the network 16.

The internal interface 76 is connected via the internal bus 42 to the internal switch 24 and adapted to receive the internal packets PE2 supplied from the packet processing module 28 to deliver the received packets PE2 to the packet transmitter 78.

The packet transmitter 78 is connected via internal buses 82 and 84 to the internal interface 76 and the external interface 80, respectively. The packet transmitter 78 serves as extracting output packets PO from the data fields of the internal packets PE2 supplied from the internal interface 76 to deliver the extracted packets PO over the internal bus 84 to the external interface 80.

The external interface 80 has its output connected via the output port 14b of the packet processor 10 to the network 16. The external interface 80 transmits the output packets PO supplied from the packet transmitter 78 to the network 16.

Next, the packet receiving processor 56 in the packet receiving module 26 will be described. As described previously, in a case where the supplied packets are the input packets PI of media communications, the packet receiving processor 56 processes the input packets PI by means of its data stream discriminator 60 and internal packet generator 62.

The packet receiving processor 56 can determine whether or not the supplied packets are input packets PI of media communications, for example, on the basis of the header information such as port numbers contained in the headers of the supplied packets.

If the packets received by the packet receiving processor 56 are not input packets PI, for instance, if they are packets for network control, then the processor 56 may perform processing similarly to conventional servers such as media conversion servers. Thus, the detailed description of such processing is avoided.

If the packets supplied from the external interface 54 are input packets PI, the data stream discriminator 60 first determines which data stream the packets correspond to. In the context, a data stream refers to an end-to-end audio data stream flowing between the SIP terminals 20, for example, from a SIP terminal 20a to another SIP terminal 20b. In this example, a voice phone conversation between the SIP terminals 20a and 20b may be subjected to media conversion, such as conversion made by audio codec, by the packet processor 10. Thus, between the SIP terminals 20a and 20b, a couple of streams are conveyed in opposite ways.

The data stream discriminator 60 is adapted to manage data streams with specific data stream identifications (IDs) given thereto, and determine which data stream ID each received input packet PI corresponds to. No restrictions may be imposed on how the data stream discriminator 60 determines data stream IDs. In the instant illustrative embodiment, a data stream identification table 86 that is shown in FIG. 7 may be used to determine the data stream IDs of received input packets PI. In the data stream identification table 86, table data may be set under the control of the control module 22.

Figures 6, 7:
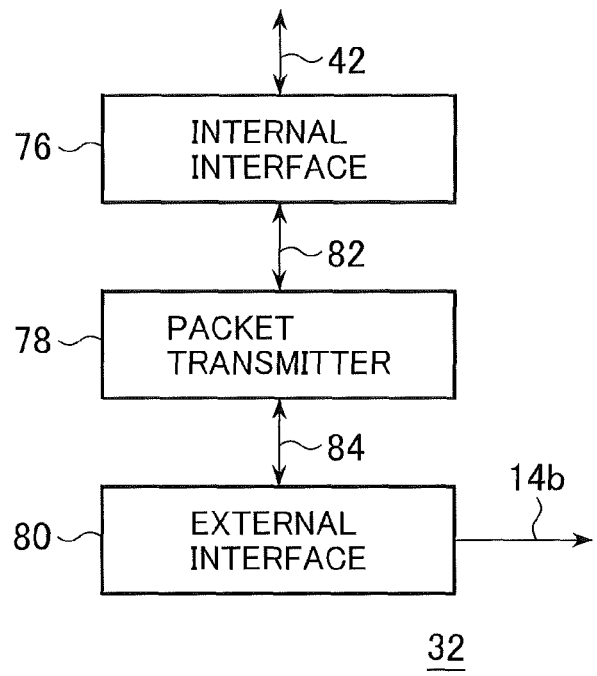
FIG. 6 is a schematic block diagram showing the configuration of a packet transmitting module included in the packet processor shown in FIG. 1.
FIG. 7 shows a data stream identification table held in the packet receiving module shown in FIG. 4.

As seen from FIG. 7, the data stream identification table 86 serves to register data stream identification information required for specifying each individual data stream ID. The data stream identification information may include a source address, a source port number, a destination address and a destination port number specific to each data stream ID. It may not be restrictive to the example shown in FIG. 7 what items are included in the data stream identification information are not restricted so far as a data stream identification table can be used to specify data streams.

In FIG. 7, the data stream ID of a data stream flowing from the SIP terminal 20a to the SIP terminal 20b is indicated as FID1. Similarly, the data stream ID of a data stream going from the SIP terminal 20b to the SIP terminal 20a is indicated as FID2.

In the following description, the SIP terminals 20a and 20b have their IP addresses indicated by IP1 and IP2, respectively, as shown in FIG. 7. A port number used by the SIP terminal 20a to send and receive packets to and from the SIP terminal 20b is indicated by P1. Similarly, a port number used by the SIP terminal 20b to transmit and receive packets to and from the SIP terminal 20a is indicated by P.

On the basis of the data stream ID of each input packet PI determined by the data stream discriminator 60, the internal packet generator 62 proceeds to processing. More specifically, the internal packet generator 62 references the header processing table 88 shown in FIG. 8 to assemble internal packets PE1.

FIGS. 9A and 9B illustrate an example of configuration of the internal packets PE1 the internal packet generator 62 assembles. FIG. 9A shows the configuration of an internal packet PE1, i.e. Ethernet frame in this embodiment. FIG. 9B shows the data field 91 of the internal packet PE1 in more detail.

As shown in FIG. 9A, the internal packets PE1 may be formed by the fields of destination MAC address, transmitter MAC address, type value for Ethernet, data and cyclic redundancy check (CRC).

As described previously, the data field 91 of each internal packet PE1 may have at least a packet 90 to be processed by the packet processing module 28 inserted. As initial data of a packet 90 to be processed, the packet receiving module 26 may insert an input packet PI into the data field 91 of the internal packet PE1.

In the data field 91 of the internal packet PE1, the internal packet generator 62 then adds process control information 92, FIG. 9B, as information on processing the packet PE1 along with the so-inserted packet 90 to be processed. In this embodiment, the process control information 92 may include a media conversion ID and a data stream ID as information on media conversion the packet processing module 28 performs on the packet 90 to be processed.

The media conversion ID is an identification allotted specifically in common within the packet processor 10 to a combination of parameters, such as formats of audio codec algorithms for an input packet PI and an output packet PO, i.e. algorithms before and after converted.

For illustration only, in a case where audio data with G.711 μ-law codec are converted into audio data with G.722.1 codec, the media conversion ID may be indicated by "TID1", and a media conversion ID used when audio data with G.722.1 codec are converted into audio data with G.711 μ-law codec may be indicated by "TID2". For simplicity, media conversion IDs are indicated by TID1, TID2 and so forth. However in practice, media conversion IDs may preferably be represented in a simpler form of minimum amount of data such as "1, 2 . . . " Media conversion IDs may be represented in binary, rather than in decimal.

The codec format as described above may not be restrictive. The packet processor 10 may be adapted to any other codec formats. For example, media conversion IDs may be assigned to any other combinations of parameters, such as combinations of bit rate and data compression rate. In an application where the packet processing module 28 is adapted to recognize the details of the media conversion, other parameters defining media conversion IDs may be applied such as information on both unconverted and converted codec algorithms.

In the internal packet generator 62, the media conversion IDs are managed for individual data stream IDs on the header processing table 88 shown in FIG. 8. On the table 88, the data streams FID1 and FID2 have the media conversion IDs thereof set to TID1 and TID2, respectively.

In the packet processor 10, when the internal packets PE1 are delivered from the packet receiving processor 56 of the packet receiving module 26 to the packet processing module 28, a DSP 70 and a core 72 are assigned for processing the input packet PI contained in the internal packet PE1.

More specifically, the packet receiving processor 56 manages the MAC addresses of the cores 70 for respective data stream IDs as shown in FIG. 8, such MAC addresses being referred to as assigning core MAC addresses. When the packet receiving processor 56 assembles an Ethernet header in an internal packet PE1, it sets an assigning core MAC address corresponding to the data stream ID in the destination MAC address field of that header.

In FIG. 8, regarding the data stream FID1 has its assigning core MAC address set to MAC311, which is the MAC address of the core 72*a* of the DSP 70*a*. The data stream FID2 has its media conversion ID set to MAC321, which is the MAC address of the core 72*e* of the DSP 70*b*.

Accordingly, for example, an internal packet PE1 based on an input packet PI having its data stream ID identified as FID1 by the data stream discriminator 60 will have its transmitter and destination MAC addresses set to "MAC200" and "MAC311", respectively. Furthermore, the process control information 92 will have its media conversion ID and data stream ID set to "TID1" and "FID1", respectively.

The functional inside configuration of the core 72 for receiving and processing internal packets PE1 will be described with reference to FIG. 10, which shows an illustrative embodiment of the core 72. The cores 72*a* through 72*l* may be the same in configuration as each other, and may generally be designated with a reference numeral 72.

Figures 10, 11:
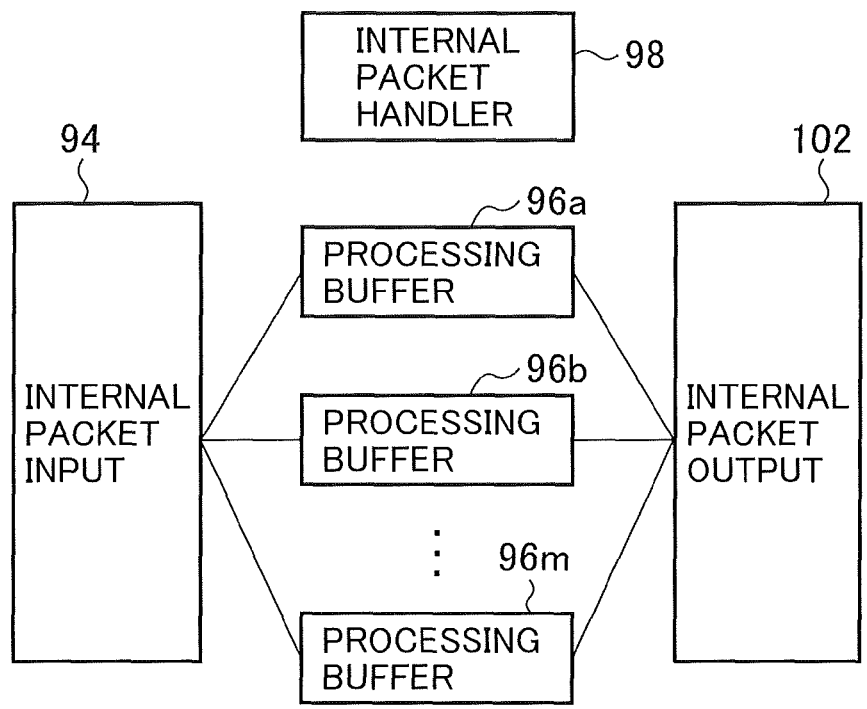
FIG. 10 is a schematic block diagram illustrating the functional configuration of a core of a digital signal processor (DSP) in the packet processing module shown in FIG. 5.
FIG. 11 shows a buffer management table held in the packet processing module shown in FIG. 5.

As shown in FIG. 10, the core 72 has an internal packet input 94 for receiving internal packets PE1, processing buffers 96*a*-96*m* for temporarily storing the internal packets PE1, an internal packet handler 98 for processing the internal packets PE1, and an internal packet output 102 for outputting the packets processed by the internal packet handler 98.

Note that the functional configuration of the core 72 is shown in FIG. 10 as physical components, which may not be restrictive. All or some of those functional components may be implemented in software.

Each of the processing buffers 96*a*, 96*b* . . . 96*m* is adapted to temporarily store an internal packet PE1 specifically associated with a data stream having its data stream ID. The processing buffers 96*a*, 96*b* . . . 96*m* may be the same in structure as each other, and also generally designated with a reference numeral 96. No restriction may be imposed on the number of the processing buffers 96 incorporated in the core 72. The number of the buffers 96 may be different even from core to core 72.

With the illustrative embodiment, in the core 72, each of the processing buffers 96 has its ID specifically assigned, which may be referred to as a buffer ID. In this embodiment, the buffer IDs of the processing buffers 96*a*-96*m* are indicated by BID1-BIDM, respectively.

In the core 72, the respective processing buffers 96 correspond to data stream IDs specific thereto. The correspondence of the buffers 96 to data stream IDs are managed by a buffer management table 104, FIG. 11, held in the internal packet input 94.

In the example shown in FIG. 11, the buffer ID "BID1" of the processing buffer 96*a* and the data stream ID "FID1" are correlated to each other. On the buffer management table 104 shown in FIG. 11, the column, data stream ID, may contain a parameter value marked with "-", which is indicative of that processing buffer 96 being not in use.

When the internal packets PE1 are supplied, the internal packet input 94 extracts information on the data stream ID from the process control information field 92 of the packets PE1. The internal packet input 94 then references the buffer management table 104 with the data stream ID to thereby obtain a buffer ID corresponding thereto, and stores the internal packets PE1 to a processing buffer 96 corresponding to the obtained buffer ID.

If the data stream ID extracted from the process control information field 92 of the internal packet PE1 is not found, i.e. not registered, in the buffer management table, which means that data stream ID is new, the internal packet input 94 assigns the unregistered data stream to an empty processing buffer 96. More specifically, the internal packet input 94 registers the data stream ID of that new data stream in association with a buffer ID having no data stream ID assigned in the buffer management table 104.

The internal packet handler 98 takes out from the internal packets PE1 held in the processing buffers 96 the media conversion ID and the input packet PI to be processed. The internal packet handler 98 in turn conducts a media conversion, or codec conversion, on the extracted packet to be processed according to a method associated with the extracted media conversion ID to thereby assemble an output packet PO.

The internal packet handler 98 further assembles an internal packet PE2 having the output packet PO inserted in the form of frame having a MAC address destined for the packet transmitting module 32. The internal packet PE2 will be delivered to the internal interface 68.

Since the media conversion itself performed by the internal packet handler 98 may be similar to the process done by any conventional media conversion servers, further details thereon will not be described.

Figure 12:
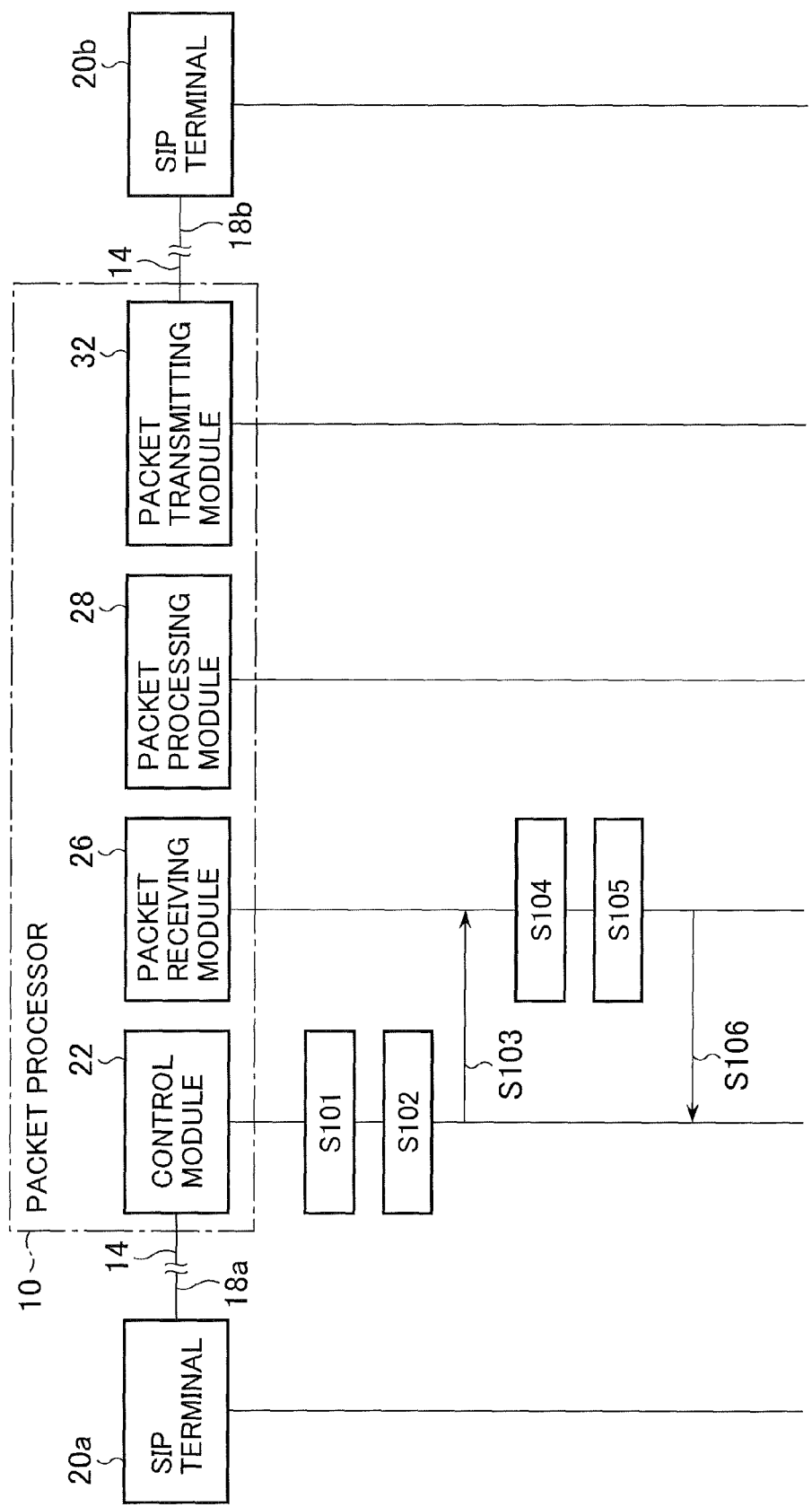
FIG. 12 is a sequence diagram illustrating preparing operations of the packet processor shown in FIG. 1 for accepting new data streams.
Figure 13:
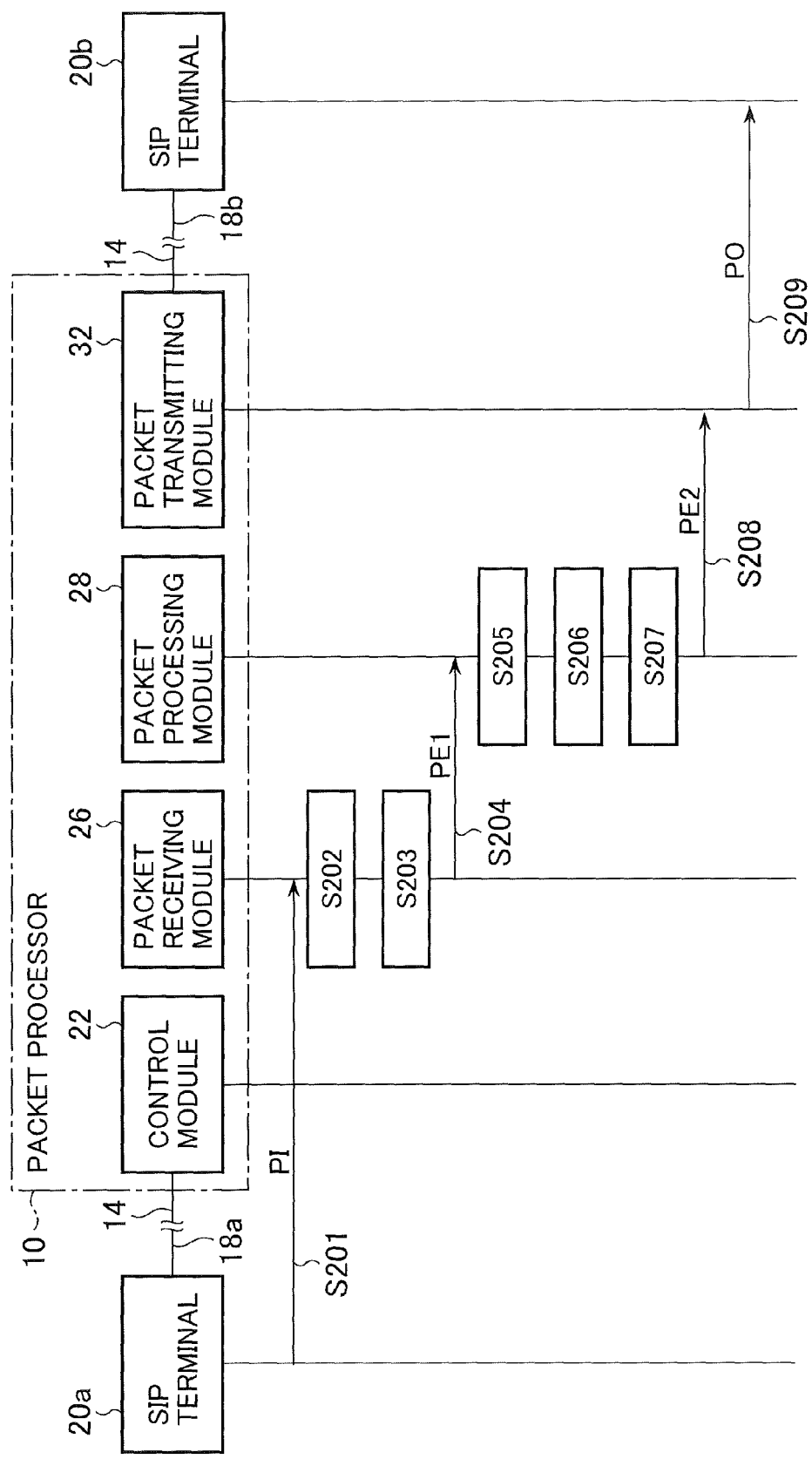
FIG. 13 is a sequence diagram illustrating operations for processing input packets supplied in the packet processor shown in FIG. 1.
Figure 14:
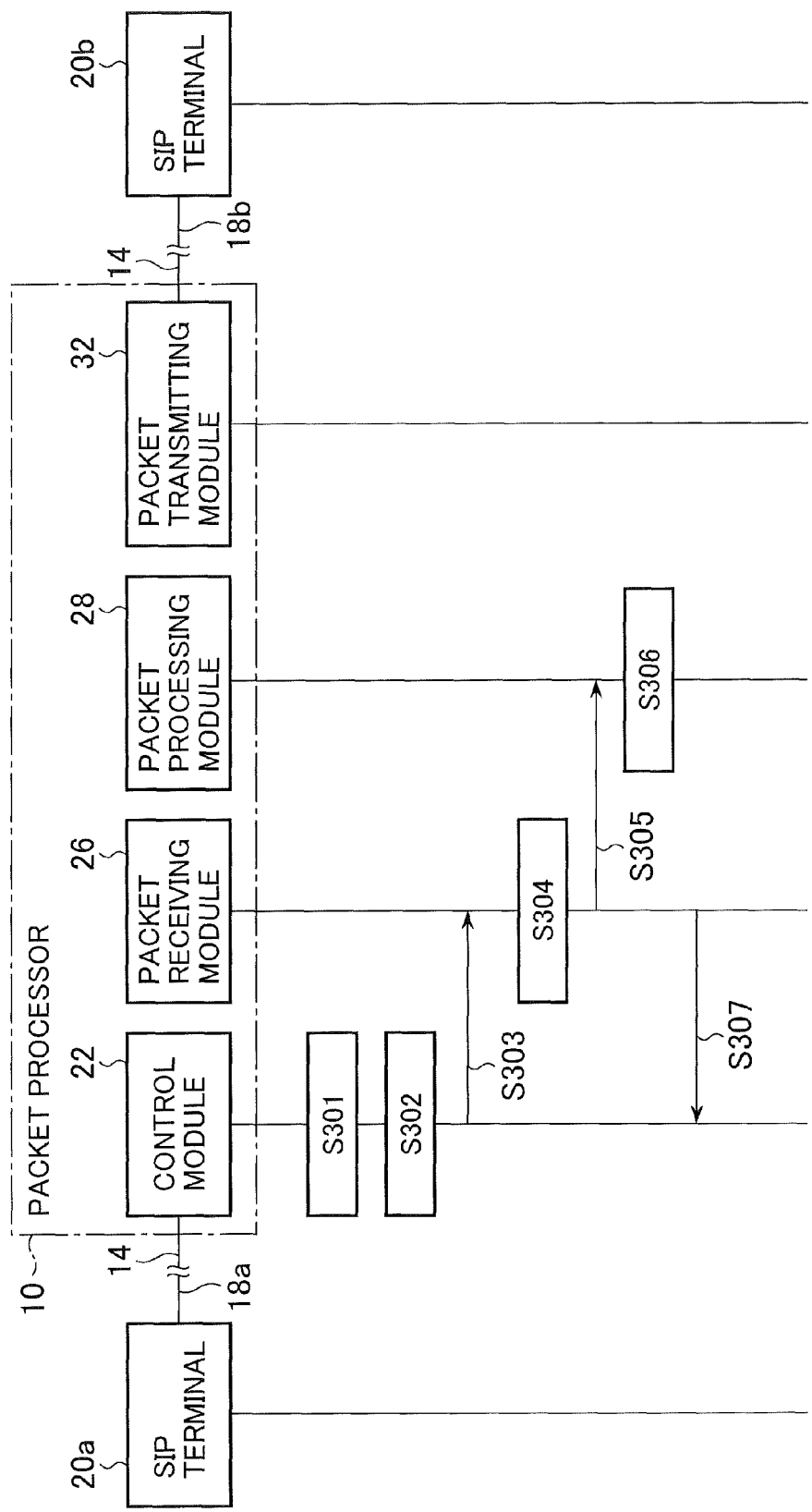
FIG. 14 is a sequence diagram illustrating operations performed by the packet processor shown in FIG. 1 when a data stream is cut off.

The operation of the packet processor 10 of the instant preferred embodiment configured as described so far will be described with reference to the sequence diagrams of FIGS. 12, 13 and 14. For the sake of simplicity, the sequence diagrams shown in FIGS. 12-14 are focused on when data streams flow from the SIP terminal 20*a* toward the SIP terminal 20*b*. The operations of the packet processor 10 on specific data streams will not be described in detail since they may merely be different in various parameters, such as a way of media conversion or address.

FIG. 12 is a sequence diagram illustrating preparing operation for accepting new data streams by the packet processor 10.

Now, the control module 22, more specifically the call controller 48, completes a call control on the SIP by means of an INVITE message between the SIP terminals 20*a* and 20*b*. Then, between the SIP terminals 20*a* and 20*b*, a connection for voice communication, namely, a session for bidirectional audio data, is established (step S101).

The call controller 48 supplies the module controller 46 having the information generator 50 with information on data streams of voice communication flowing between the SIP terminals 20*a* and 20*b*. The module controller 46 assigns data stream IDs and cores 72 to each of the data streams going from the SIP terminal 20*a* to the SIP terminal 20*b* and from the terminal 20*b* to the terminal 20*a* (step S102).

The information supplied from the call controller 48 to the module controller 46 contains information required to determine a parameter set in the packet receiving module 26. In particular, such information is, for each data stream, the source address, the source port number, the destination address, the destination port number, the type of media with which the transmitter SIP terminal 20 is compliant and the type of media with which the destination SIP terminal 20 is compliant. The type of media, such as codec type, with which transmitter source and destination SIP terminals 20 are compliant may be represented by the aforementioned media conversion IDs.

In this example, the module controller 46, more specifically the information generator 50, gives a data stream ID, FID1, to data streams from the SIP terminal 20*a* to the SIP terminal 20*b*. Similarly, the module controller 46 gives a data stream ID, FID2, to data streams from the SIP terminal 20*b* to the SIP terminal 20*a*. The data streams FID1 and FID2 are allotted to assigning core MAC addresses MAC311 and MAC321, respectively.

The information generator 50 in the module controller 46 holds, in this example, information similar to the information stored in the data stream identification table 86 in the data stream discriminator 60 and in the header processing table 88 in the internal packet generator 62.

The information generator 50 in the module controller 46 gives the packet receiving module 26 an instruction initiating a new processing step on the data streams FID1 and FID2 as well as information necessary for setting the data stream identification table 86 and header processing table 88 (step S103).

The data stream discriminator 60 in the packet receiving module 26 has, when notified from the module controller 46, information on the new data streams FID1 and FID2 set in the data stream identification table 86 (step S104). In this example, the execution of step S104 causes the data stream identification table 86 to contain the settings shown in FIG. 7.

The internal packet generator 62 of the packet receiving module 26 has, when notified from the module controller 46, information on the new data streams FID1 and FID2 set in the header processing table 88 (step S105). In this example, the execution of step S105 causes the header processing table 88 to contain the settings shown in FIG. 8.

Upon completion of the entry of the data into the tables, the packet receiving module 26 notifies the module controller 46 of the completion of preparation for the new data streams FID1 and FID2 (step S106).

Thus, the packet receiving module 26 in the packet processor 10 executed the processing for preparing for accepting new data streams.

Next, it will be described with reference to the sequence diagram of FIG. 13 how the packet processor 10 processes the input packet PI received from the SIP terminal 20*a* to send out the output packet PO toward the SIP terminal 20*b*.

In the present example, the packet receiving module 26 has information on the data stream IDs, FID1 and FID2, already set through the processing shown in and described with reference to FIG. 12.

In the packet receiving module 26, when the input packet PI arrives which contains the data stream FID1 from the SIP terminal 20*a* to the SIP terminal 20*b* (step S201), the data stream discriminator 60 identifies the data stream of the input packet PI (step S202).

The input packet PI is processed by the internal packet generator 62 according to the result from the identification, i.e. FID1, by the data stream discriminator 60. Thus, the internal packet PE1 is assembled (step S203). The destination MAC address of the internal packet PE1 is set to MAC311, which is assigned to the core 72*a* in the DSP 70*a*, on the basis of the header processing table 88.

The internal packet PE1 is delivered through the internal switch 24 to the core 72*a* in the DSP 70*a* in the packet processing module 28 serving as part of the internal packet processor 30 (step S204).

The core 72*a* in the DSP 70*a* receives the internal packet PE1 of the data stream FID1 in question, for the first time. Then, the data stream is assigned to a new processing buffer 96, thus being registered in the buffer management table 104 (step S205).

In this example, in the core 72*a* of the DSP 70*a* a processing buffer 96 having its buffer ID of BID1 is assigned to the data stream of FID1. The buffer management table 104 will be what is shown in FIG. 11.

The internal packet PE1 is supplied by the internal packet input 94 in the core 72*a* of the DSP 70*a* to the processing buffer 96 assigned to that data stream (step S206).

The internal packet handler 98 in the core 72*a* commences processing on the internal packet PE1 held in the processing buffer 96*a* (step S207) to assemble the output packet PO at the timing corresponding to the processing. That is to say, in the processing buffer 96*a*, the internal packet PE2 having the output packet PO inserted therein is produced and then delivered to the packet transmitter 78 (step S208).

In the packet transmitting module 32, when having received the internal packet PE2, the packet transmitter 78 takes out the output packet PO from the internal packet PE2 and then transmits the latter toward the SIP terminal 20*b* (step S209).

Then, the packet processor 10 performs similar processing whenever the input packet PI for a data stream of FID1 is supplied, except for the step S205 of assigning the processing buffer CB.

It will be described with reference to FIG. 14 how the packet processor 10 operates to disconnect the call when the voice communication between the SIP terminals 20*a* and 20*b* terminates.

First, the call controller 48 is responsive to a termination of the voice communication between the SIP terminals 20*a* and 20*b* to perform a call control of disconnecting the call (step S301).

The call control by the call controller 48 to cut off, or release, a voice call may be similar to the processing performed, for example, by a conventional SIP server, or call control server. Thus, detailed description thereon is avoided.

The call controller 48 feeds the the module controller 46 having the cutoff controller 52 with data stream information on the voice communication between SIP terminals 20*a* and 20*b*. The module controller 46 in turn refers to the supplied information to check the appropriate data stream ID (step S302).

As described previously, the module controller 46 holds information similar to that held in the data stream identification table 86 possessed by the data stream discriminator 60 and the header processing table 88 possessed by the internal packet generator 62.

From the call controller 48 to the module controller 46, at least such information is supplied which is capable of identifying the data stream ID of a data stream to be cut off. For example, such information may be the same as supplied from the call controller 48 to the module controller 46, as already described in connection with step S102.

The cutoff controller 52 in the module controller 46 detects the data stream IDs, FID1 and FID2, to confirm which data streams are to be cut off.

The cutoff controller 52 in the module controller 46 informs the packet receiving module 26 of the execution of the cutoff subroutine on the data streams FID1 and FID2 (step S303).

The data stream discriminator 60, when thus informed by the module controller 46 of the packet receiving module 26, deletes appropriate information on the data streams FID1 and FID2 to be cut off from the data stream identification table. The internal packet generator 62 in the module 26 deletes, upon informed by the cutoff controller 52, the information on the data streams FID1 and FID2 to be cut off from the header processing table 88 (step S304).

The internal packet generator 62 assembles an internal control packet with its destination address set to the assigning core MAC address associated with the data stream IDs on which the cutoff subroutine will be performed to instruct the cutoff subroutine to be executed on those data stream IDs. The generator 62 in turn delivers the assembled control packet to the destination address (step S305).

More specifically, in the internal packet generator 62, an internal control packet meant for a core 72*a* having its MAC address, MAC311, of the DSP 70*a* is produced for instructing the execution of the cutoff subroutine on the data stream FID1 to be delivered to the core 72*a*. The generator 62 further generates another internal control packet meant for the core 72 having its destination address MAC321 of the DSP 70*b* to instruct the execution of the cutoff subroutine on the data stream of FID2 to be delivered to the destination address.

No restriction may be placed on the descriptive format of internal packets for instructing the cutoff subroutine. For example, the process control information field 92 of an internal packet may include both an instruction signal representing that the cutoff subroutine is to be performed in the form of, e.g. a predetermined pattern of data instructing the execution of the cutoff subroutine and the data stream ID of a data stream to be cut off.

In this example described, the packet receiving module 26 instructs in the step S305 the packet processing module 28 to cut off the data streams. However, such an instruction may be directly given from the control module 22.

The cores 72*a* and 72*e* in the packet processing module 28, when having received the internal packet instructing the execution of the cutoff subroutine from the packet receiving module 26, delete information on the data stream IDs, FID1 and FID2, of data streams to be cut off from the data stream identification table 86 to render the processing buffer 96 associated therewith unused (step S306).

When the internal packet instructing the packet processing module 28 to cut off data streams has been transferred and the information has been deleted from the tables, the packet receiving module 26 notifies the control module 22, more specifically module controller 46, that the cutoff subroutine has been completed on the data streams FID1 and FID2 (step S307). The packet processor 10 thus performed the cutoff subroutine on data streams according to the results from the call control.

The instant preferred embodiment described so far has the following advantages. In the packet processor 10, the packet receiving module 26 produces the internal packet PE1 with its process control information field 92 having the input packet PI to thereby give an instruction for processing the packet PE1 to a module following thereto, i.e. the packet processing module 28. The packet processor 10 can therefore perform packet processing on data streams simply by controlling the packet receiving module 26 by means of the control module 22.

Conventional packet processors including plural modules required that a control module controlling the entire processor provides the control over all the remaining modules and inter-module synchronization. On the contrary, in the illustrative embodiment of the invention, as described previously, the packet receiving module 26 assembles the internal packet PE1 with its process control information 92 added to be transmitted a module successive thereto, e.g. the packet processing module 28, thereby being capable of reducing the amount of control provided by the control module 22.

In summary, the packet processor 10 is so structured as to reduce the amount of processing incurred when the control module 22 controls the remaining modules, thereby reducing the communications traffic between the modules and rather enhancing the controlling performance of the whole packet processor 10. Especially, in an application where the packet processor 10 is implemented by hardware devices that are low in control capacity but high in packet processing capacity, the aforementioned advantages will be predominant. Further, the packet processor 10, when implemented by hardware devices made of a relatively increased number of functional modules, may more extensively enjoy the aforementioned advantages.

The present invention may not be restricted to the above illustrative embodiment. Alternative embodiments will be described. For example, the packet processor 10 of the above embodiment includes the sole packet processing module 28, which serves as the internal packet processor 30. However, the internal packet processor 30 may be implemented by a plurality of packet processing modules.

Figure 15:
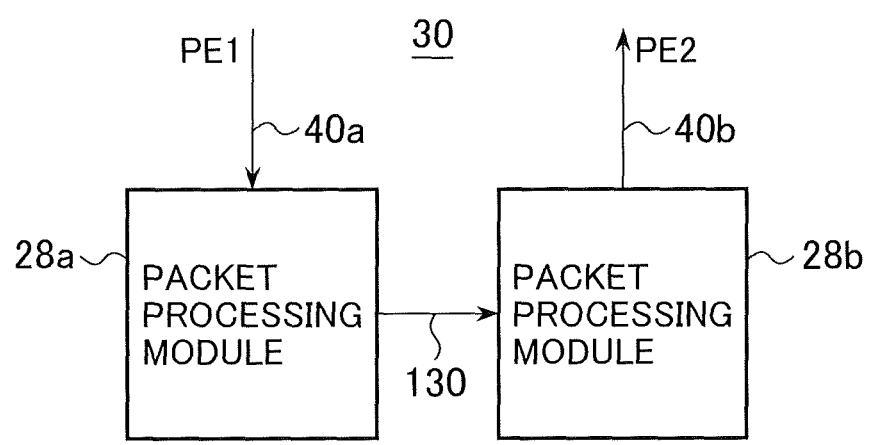
FIG. 15 is a schematic block diagram showing an internal packet processor included in an alternative embodiment of the present invention.

FIG. 15 depicts in a block diagram the internal packet processor 30 including a plurality of packet processing modules, two modules 28*a* and 28*b* with the present alternative embodiment. Of course, the number of the modules 28 included in the internal packet processor 30 may be arbitrary.

The internal packet processor 30 shown in FIG. 15 comprises the packet processing module 28*a* having its input port interconnected to receive an internal packet PE1 via an internal bus 40*a*, which is included in the internal bus 40, from the packet receiving module 26. The packet processing module 28*a* further has its output port interconnected to supply the internal packet PE2 by a connection 130 to the packet processing module 28*b* positioned downstream thereto.

For example, the packet processing module 28*b* can code the internal packet PE2 produced by the module 28*a*. The packet processing module 28*b* is connected via an internal bus 40*b*, which is also included in the internal bus 40, to the packet transmitting module 32 to supply the coded internal packet PE2 to the transmitting module 32.

In the illustrative embodiment previously described, the packet processor 10 performs media conversion on audio data inserted in packets to be processed by the use of the single packet processing module 28. However with the alternative embodiment described above, a coding process may be performed by the packet processing module 28*b* arranged downstream of the preceding packet processing module 28*a*. In this way, packets may be processed by the packet processor 10 having a multistage or cascade configuration, in which the plurality of packet processing modules 28 are interconnected in cascade.

In the packet processor 10 thus comprising the plurality of cascaded packet processing modules 28, the internal packet generator 62 in the packet receiving module 26 may be adapted to assemble internal packets PE1 with the process control information field 92 thereof carrying control information regarding each packet processing module 28 stacked therein. In this case, the control information of each packet processing module 28 may include information on, for example, the details of processing performed by the packet processing modules 28, e.g. encryption scheme or parameters relevant to the encryption, and/or a destination, e.g. MAC address, for use in transferring an internal packet to the downstream packet processing module 28.

In short, the packet receiving module 26 produces internal packets PE1 having the process control information field 92 thereof containing control information on the multiple stages of packet processing modules 28 and the input packets PI to be processed. The packet receiving module 26 then delivers the produced internal packets to the first one of the cascaded packet processing modules. The packet receiving module 26 can thereby cause each of the cascaded packet processing modules 28 to process its appropriate packets to be processed. Therefore, the packet processor 10 can provide inter-module control more effectively with a reduced amount of control as an increased number of packet processing modules 28.

In the above illustrative embodiments, the packet processor 10 per se is not adapted for converting the address in the header of input packets PI to be processed. Namely, the processor 10 of those embodiments does not convert the IP addresses of a transmitter source and a destination and their port numbers. However, the packet processor 10 may include a converter for converting such addresses in the headers and so on.

In the packet processor 10, any of the module is adapted for converting the addresses in the headers. For example, the internal packet generator 62 in the packet receiving module 26 may perform the address conversion. For example, the internal packet generator 62 may conduct an address conversion on an input packet PI to form a packet to be processed, which will in turn be inserted into an internal packet PE1. In this case, the internal packet generator 62 may consult with an address conversion table, not shown, to thereby perform address conversion on the input packet PI. The address conversion table, which may be held by the internal packet generator 62, and a specific address conversion operation performed by the generator 62 may be similar to those of routers compliant, for example, with the conventional network address translation (NAT) and network address port translation (NAPT).

The entire disclosure of Japanese patent application No. 2011-252684 filed on Nov. 18, 2011, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A packet processor, configured as a blade server, for processing an input packet, comprising:
   a control module, configured as a first blade, including an information generator generating process control information for processing the input packet;
   a packet receiving module, configured as a second blade, including an internal packet generator receiving the input packet as a packet to be processed and adding the process control information to the packet to be processed to produce an internal packet, the internal packet generator additionally supplying a destination MAC address that is added to the internal packet and that is determined based on processing to be performed on the internal packet;
   a packet processing module, configured as a third blade, including an internal packet processor processing the internal packet based on the process control information added to the internal packet, the internal packet processor including a plurality of cores assigned to respective MAC addresses;
   a packet transmitting module, configured as a fourth blade, including a packet transmitter extracting an output packet from the processed internal packet to transmit the output packet; and
   an internal switch routing data between said modules.

2. The packet processor in accordance with claim 1, further comprising:
   a data stream identification table managing information on a data stream of the input packet; and
   a data stream discriminator specifying the data stream of the input packet on the basis of the information managed by said data stream identification table,
   wherein said information generator generates the process control information on the basis of the information on the data stream of the input packet.

3. The packet processor in accordance with claim 2, wherein the process control information includes processing identification data specifying details of the processing of the input packet added to the internal packet.

4. The packet processor in accordance with claim 3, wherein the process control information further includes data stream identification data for specifying the data stream of the internal packet.

5. A method for processing an input packet inputted into a packet processor that is configured as a blade server including a plurality of modules configured as blades, the module being connected via an internal switch routing data between the modules, comprising:
   receiving the input packet as a packet to be processed;
   generating process control information for processing the input packet using a first one of the modules;
   adding the process control information to the packet to be processed to produce an internal packet, and supplying a MAC address that is added to the internal packet and that is determined based on the processing to be performed on the internal packet, using a second one of the modules;
   associating a plurality of MAC addresses with a plurality of cores, each core being assigned to a respective one of the MAC addresses;
   processing the internal packet in one of the cores based on the added MAC address the process control information added to the internal packet using a third one of the modules;
   extracting an output packet from the processed internal packet using a fourth one of the modules; and
   transmitting the output packet outside the processor.

6. The method in accordance with claim 5, further comprising:
   managing information concerning a data stream that includes the input packet with a data stream identification table;
   specifying the data stream that includes the input packet on the basis of the information managed by the data stream identification table; and
   generating the process control information on the basis of the information concerning the data stream that includes the input packet.

7. The method in accordance with claim 6, wherein the process control information includes processing identification data specifying details of the processing of the input packet added to the internal packet.

8. The method in accordance with claim 7, wherein the process control information further includes data stream identification data for specifying the data stream that includes the internal packet.

\* \* \* \* \*